United States Patent
Bursell et al.

(10) Patent No.: US 11,886,899 B2
(45) Date of Patent: *Jan. 30, 2024

(54) PRIVACY PRESERVING INTROSPECTION FOR TRUSTED EXECUTION ENVIRONMENTS

(71) Applicant: Red Hat, Inc., Raleigh, NC (US)

(72) Inventors: Michael Bursell, Great Yeldham (GB); Michael Tsirkin, Westford, MA (US)

(73) Assignee: RED HAT, INC., Raleigh, NC (US)

(*) Notice: Subject to any disclaimer, the term of this patent is extended or adjusted under 35 U.S.C. 154(b) by 124 days.

This patent is subject to a terminal disclaimer.

(21) Appl. No.: 16/863,685

(22) Filed: Apr. 30, 2020

(65) Prior Publication Data

US 2021/0342174 A1    Nov. 4, 2021

(51) Int. Cl.
*G06F 9/455* (2018.01)
*G06F 21/53* (2013.01)
(Continued)

(52) U.S. Cl.
CPC .......... *G06F 9/45558* (2013.01); *G06F 9/505* (2013.01); *G06F 9/5077* (2013.01); *G06F 11/0772* (2013.01); *G06F 11/327* (2013.01); *G06F 21/53* (2013.01); *G06F 2009/45583* (2013.01); *G06F 2009/45587* (2013.01); *G06F 2009/45591* (2013.01)

(58) Field of Classification Search
CPC .... G06F 9/45558; G06F 9/505; G06F 9/5077; G06F 2009/45583; G06F 2009/45587; G06F 2009/45591; G06F 11/0772; G06F 11/327; G06F 21/53
See application file for complete search history.

(56) References Cited

U.S. PATENT DOCUMENTS 9,438,618 B1 * 9/2016 Sultan ..................... G06F 21/53
9,501,224 B2   11/2016 Lagar et al.
(Continued)

FOREIGN PATENT DOCUMENTS

CN    109240807 A  *  1/2019
JP    2015185127 A  *  10/2015

OTHER PUBLICATIONS

Yanlin Li, CyLab/Carnegie Mellon University, et al.; "MiniBox: A Two-Way Sandbox for x86 Native Code"; 2014 USENIX Annual Technical Conference; USENIX Association; Jun. 19-20, 2014; Philadelphia, PA; 978-1-931971-10-2; pp. 409-420 (13 Pages).

(Continued)

*Primary Examiner* — Emerson C Puente
*Assistant Examiner* — Zhi Chen
(74) *Attorney, Agent, or Firm* — K&L Gates LLP

(57) ABSTRACT

A system includes a memory, a processor in communication with the memory, a hypervisor, and a trusted execution environment (TEE). The TEE is provisioned with a workload and includes an introspection module. The introspection module is configured to execute an introspection command according to an introspection policy. The introspection command is configured to validate at least one memory access associated with the workload. The introspection module is also configured to determine a status of a result of the introspection commands, wherein the status is one of a failure status and a success status.

19 Claims, 8 Drawing Sheets

(51) Int. Cl.
*G06F 9/50* (2006.01)
*G06F 11/07* (2006.01)
*G06F 11/32* (2006.01)

(56) References Cited

U.S. PATENT DOCUMENTS

| | | | | |
|---|---|---|---|---|
| 9,596,261 | B1* | 3/2017 | Lukacs | G06F 21/554 |
| 10,649,744 | B1* | 5/2020 | Black | G06F 8/427 |
| 2005/0223108 | A1* | 10/2005 | Maffeis | H04L 51/066 |
| | | | | 709/232 |
| 2008/0104080 | A1* | 5/2008 | Copeland | G06F 16/25 |
| 2012/0030689 | A1* | 2/2012 | Li | G06F 9/541 |
| | | | | 719/318 |
| 2015/0381578 | A1* | 12/2015 | Thota | H04L 9/14 |
| | | | | 713/168 |
| 2016/0191521 | A1* | 6/2016 | Feroz | G06F 16/9535 |
| | | | | 726/1 |
| 2017/0063801 | A1* | 3/2017 | Faynberg | G06F 9/45558 |
| 2018/0285561 | A1* | 10/2018 | Frank | G06F 21/562 |
| 2018/0293394 | A1* | 10/2018 | Gunda | G06F 9/45558 |
| 2019/0068555 | A1* | 2/2019 | Tsirkin | H04L 63/0236 |
| 2019/0188282 | A1* | 6/2019 | Dwyer | G06F 16/951 |
| 2019/0253523 | A1* | 8/2019 | Raduchel | H04L 63/062 |
| 2021/0021634 | A1* | 1/2021 | Babakian | G06F 9/45558 |
| 2021/0124825 | A1* | 4/2021 | Dabak | G06F 9/45545 |
| 2021/0136080 | A1* | 5/2021 | McMullen | H04L 63/101 |
| 2021/0311757 | A1* | 10/2021 | Mueller | G06F 9/45558 |

OTHER PUBLICATIONS

Fangzhou Yao, Roy H. Campbell; "CryptVMI: Encrypted Virtual Machine Introspection" 2014 IEEE International Conference on Cloud Computing; Department of Computer Science; University of Illinois at Urbana-Champaign; 978-1-4799-5063-8/14 © 2014 IEEE; DOI 10.1109/CLOUD.2014.149; Aug. 2014, pp. 977-978 (2 Pages).

* cited by examiner

US 11,886,899 B2

PRIVACY PRESERVING INTROSPECTION FOR TRUSTED EXECUTION ENVIRONMENTS

BACKGROUND

Trusted execution environments, such as trusted virtual machines may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

Trusted execution environments may include containers, enclaves and virtual machines. Virtualization may be achieved by running a software layer, often referred to as a hypervisor, above the hardware and below the trusted execution environment, such as guest virtual machines or containers. A hypervisor may run directly on the server hardware without an operating system beneath it or as an application running on a traditional operating system. A hypervisor may virtualize the physical layer and provide interfaces between the underlying hardware and trusted execution environments. In some cases, the trusted execution environments may be encrypted for security purposes. During execution, a system owner or administrator may perform debugging or forensic analysis while monitoring the activities of trusted execution environments and associated runtimes and workloads.

SUMMARY

The present disclosure provides new and innovative systems and methods for preserving privacy when performing introspection services for trusted execution environments, such as a virtual machines ("VMs"), containers and enclaves. In an example, a system includes a memory, a processor in communication with the memory, a hypervisor, and a trusted execution environment ("TEE"). The TEE is provisioned with a workload and includes an introspection module. The introspection module is configured to execute an introspection command according to an introspection policy. The introspection command is configured to validate at least one memory access associated with the workload. The introspection module is also configured to determine a status of a result of the introspection commands, wherein the status is one of a failure status and a success status.

In an example, a method includes provisioning a trusted execution environment (TEE) with a workload. The workload includes an introspection module. The method also includes executing, by the introspection module, an introspection command according to an introspection policy. The introspection command is configured to validate at least one memory access associated with the workload. Additionally, the method includes determining, by the introspection module, a status of a result of the introspection commands. The status is one of a failure status and a success status.

In an example, a system includes a memory, a processor in communication with the memory, a trusted execution environment (TEE) provisioned with a workload, and a runtime executing within the TEE. The runtime is configured to load a pre-generated memory accessing code into the TEE. The code is supplied by an owner. The runtime is also configured to receive introspection commands through an introspection channel. The introspection channel is created between the runtime and the owner. Additionally, the runtime is configured to execute the introspection command. The introspection commands are configured to validate a memory access in the pre-generated code. The runtime is also configured to determine a status of a result of the introspection commands. The status is one of a failure status and a success status.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
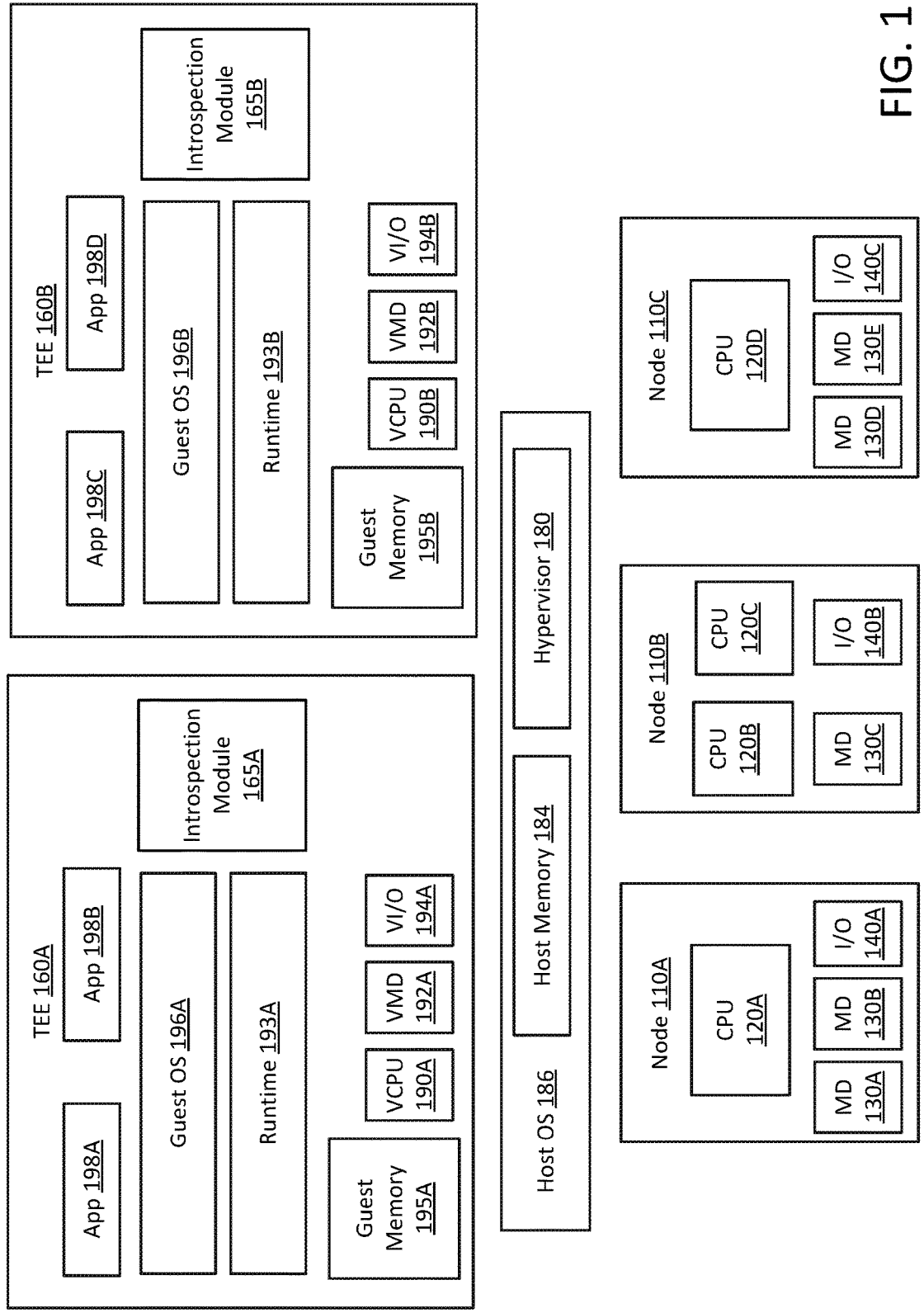
FIG. 1 illustrates a block diagram of an example computer system according to an example embodiment of the present disclosure.

Techniques are disclosed for preserving privacy when performing introspection services for trusted execution environments, such as a virtual machines ("VMs"), containers and enclaves. Modern hardware supports trusted execution environment (TEE) techniques where a supervisor of a host computer does not have access to memory of a specific TEE, such as a trusted container, a trusted virtual machine, or a trusted software enclave running on the host computer. For example, the supervisor may lack access to the memory of the TEE because the memory is protected by host hardware or host firmware. Memory encryption is one such technique to protect the memory of the TEE. In an example, encrypted memory may be used to support and protect running sensitive workloads in the cloud.

For example, TEEs allow for private computation in a cloud environment. The private computation is private from a hypervisor or supervisor, which controls the execution of the TEE. Therefore, challenges exist regarding support for safe introspection for TEEs. One example of such an environment is Enarx where an owner supplied code (e.g., owner supplied bytecode) is loaded by a runtime (e.g., WebAssembly runtime) running within a TEE (e.g., encrypted virtual machine).

Introspection is a service for identifying or finding known bad (e.g., malicious) patterns in memory of a container or a virtual machine. For example, introspection may include techniques and processes for monitoring runtimes or runtime stats of containers or virtual machines. Introspection services may be beneficial for debugging or forensic analysis and the introspection services typically run as part of the hypervisor or supervisor and are typically granted access to the memory of the container or virtual machine. Thus, performing introspection services involves trusting the hypervisor or supervisor. Typically, either a hardware sandbox (e.g., a non-encrypted virtual machine) or a software sandbox (e.g., a bytecode validator) was used where the introspection was supported as part of the hardware sandbox. However, supporting introspection through the hardware sandbox, which was non-encrypted, may compromise workload security. Additionally, the security model of TEEs does not allow that level of trust (e.g., granting the hypervisor or supervisor access to the memory of the TEE) between the TEE and the hypervisor or supervisor. Specifically, the security model of TEEs, such as an Enarx encrypted virtual machine, does not allow running introspection services as part of the hypervisor or supervisor.

Typically, workloads are executed directly within a TEE that is executing on top of a hypervisor or supervisor. For example, introspection services typically run as part of the hypervisor or supervisor. However, to address the problems discussed above and to enable support for introspection for a TEE, the workload is not executed directly within the TEE and instead owner supplied code is loaded by a runtime. The owner supplied code may be an introspection program, application, service or module that provides introspection services. The TEE owner may also supply an introspection policy that specifies which part(s) of the environment are exposed to the owner supplied code. Then, an introspection channel is created between the runtime and the owner. In an example, the introspection channel may be in the form of an encrypted connection between the runtime and the owner. Once the introspection channel is established, the runtime is supplied introspection commands. For example, the owner may supply introspection commands through the introspection channel. In another example, the hypervisor or supervisor may supply introspection commands through the introspection channel.

The introspection commands may be configured to look for, identify, or locate specific patterns in memory accessing code. These patterns may be patterns that were previously identified as bad (e.g., malicious) patterns or other unnecessary (e.g., wasteful) memory activity that cause unnecessary computing and unnecessary memory usage. The runtime validates memory accesses by executing the introspection commands thereby advantageously enabling introspection services that would otherwise be unavailable to TEEs. For example, since the introspection service runs on the TEE (e.g., encrypted virtual machine), the runtime may advantageously enforce the security policy for the introspection service and as such, the TEE may run the introspection service without having to trust a hypervisor or supervisor The validation may be implemented during code generation (e.g., by including the introspection commands in the generated code). Additionally, pre-generated code may be pre-validated. Once the results of the validation (e.g., introspection service results) are obtained, and bad (e.g., malicious) patterns are identified, the owner may take action, such as requesting the hypervisor or supervisor to stop execution of the TEE. The owner may also log the event or notify a system administrator.

Thus, TEEs can safely perform introspection without having to trust a hypervisor or supervisor. By lifting introspection capabilities to the software sandbox, introspection may be supported by TEEs without compromising workload security. Introspection is an especially important feature for cloud vendors as it adds value compared to private cloud solutions. For example, vendors using a hypervisor (e.g., Kernel-based Virtual Machine ("KVM")) on an operating system, such as Red Hat® Enterprise Linux® ("RHEL") may utilize the systems and methods disclosed herein to preserve privacy while performing introspection services for TEEs. When handling network traffic (e.g., network traffic from a cloud-computing platform such as the Red Hat® OpenStack® Platform), hypervisor vendors and operating system ("OS") vendors often attempt to improve security to prevent malicious memory accesses. An example vendor is Red Hat®, which offers RHEL. By providing introspection services while maintaining privacy for TEEs, security may be improved.

FIG. 1 depicts a high-level component diagram of an example computing system 100 in accordance with one or more aspects of the present disclosure. The computing system 100 may include an operating system (e.g., host OS 186), one or more TEEs (e.g., TEE instances 160A-B) and nodes (e.g., nodes 110A-C).

A TEE instance (e.g., TEE instance 160A) may be a virtual machine, container, enclave, etc. and may include an introspection module (e.g., introspection module 165A). Each TEE instance 160A-B may include a respective introspection module 165A-B. The TEE instance 160A-B may also include a runtime, a guest OS, guest memory, a virtual CPU (VCPU), virtual memory devices (VMD), and virtual input/output devices (VI/O). For example, TEE instance 160A may include runtime 193A, guest OS 196A, guest memory 195A, a virtual CPU 190A, a virtual memory device(s) 192A, and virtual input/output device(s) 194A. Virtual machine memory 195A may include one or more memory pages. Similarly, TEE instance 160B may include runtime 193B, guest OS 196B, guest memory 195B, a virtual CPU 190B, virtual memory device(s) 192B, and virtual input/output device(s) 194B.

The runtimes 193A-B may be a software module or environment that supports execution, such as application execution, code execution, command execution, etc. In some examples described in more detail herein, the runtimes 193A-B may validate memory accesses that occur during the application execution, code execution, command execution, etc. The runtimes 193A-B may be loaded into their respective TEEs or TEE instances 160A-B. For example, runtimes 193A-B may be loaded into TEE instances 160A-B along with a workload and may have additional permissions of the workload owner. In an example, the runtimes 193A-B may be a software or virtual layer below the workload or a layer sitting beside the workload. As illustrated in FIG. 1, TEE 160A includes both a runtime 193A and an introspection module 165A, however, in some examples, the introspection module 165A may be part of a runtime 193A or may make up the entirety of the runtime 193A or vice versa. For example, a runtime 193A may be extended to include introspection capabilities (e.g., the capabilities of introspection module 165A). In some scenarios, the runtime 193A may provide similar services and functionality as Guest OS 196A.

The computing system 100 may also include a supervisor or hypervisor 180 and host memory 184. The supervisor or hypervisor 180 may manage host memory 184 for the host operating system 186 as well as memory allocated to the TEEs (e.g., TEE instances 160A-B) and guest operating systems (e.g., guest OS 196A such as guest memory 195A provided to guest OS 196A). Host memory 184 and guest memory 195A may be divided into a plurality of memory pages that are managed by the supervisor or hypervisor 180. Guest memory 195A allocated to the guest OS 196A may be mapped from host memory 184 such that when an application 198A-D uses or accesses a memory page of guest memory 195A, the guest application 198A-D is actually using or accessing host memory 184.

In an example, a TEE instance (e.g., TEE instance 160A-B), such as a virtual machine, container or enclave may execute a guest operating system 196A and run applications 198A-B which may utilize the underlying VCPU 190A, VMD 192A, and VI/O device 194A. For example, one or more applications 198A-B may be running on a TEE under the respective guest operating system 196A. TEEs (e.g., TEE instances 160A-B) may run on any type of dependent, independent, compatible, and/or incompatible applications on the underlying hardware and OS. In an example, applications (e.g., App 198A-B) run on a TEE may be dependent on the underlying hardware and/or OS 186. In another example, applications 198A-B run on a TEE may be independent of the underlying hardware and/or OS 186. For example, applications 198A-B running on a first TEE instance 160A may be dependent on the underlying hardware and/or OS 186 while applications (e.g., application 198C) running on a second TEE instance 160B are independent of the underlying hardware and/or OS 186A. Additionally, applications 198A-B running on TEE instance 160A may be compatible with the underlying hardware and/or OS 186. In an example, applications 198A-B running on a TEE instance 160A may be incompatible with the underlying hardware and/or OS 186.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. TEE instances 160A-B may be provisioned on the same host or node (e.g., node 110A) or different nodes. For example, TEE instance 160A and TEE instance 160B may both be provisioned on node 110A. Alternatively, TEE instance 160A may be provided on node 110A while TEE instance 160B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D, may be provided by one or more local buses of suitable architecture, for example, peripheral component interconnect (PCI).

Figure 2:
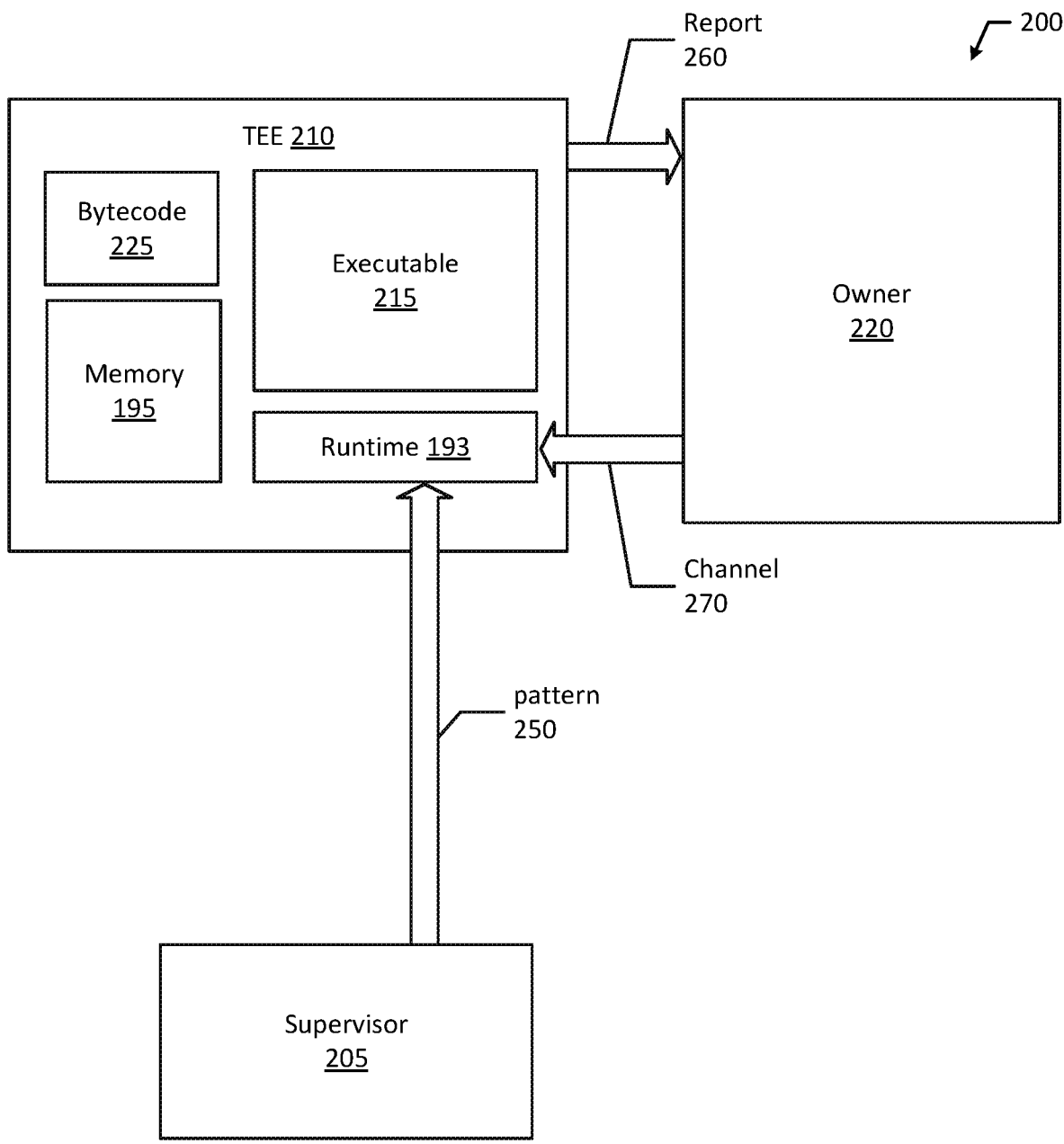
FIG. 2 illustrates a block diagram of an example privacy preserving introspection system for TEE instances according to an example embodiment of the present disclosure.

FIG. 2 illustrates a block diagram of a privacy preserving introspection system 200 for TEE instances. As illustrated in FIG. 2, a TEE instance 210 may include a runtime 193, memory 195, and bytecode 225 supplied by an owner 220. For example, owner 220 may supply an introspection service, module or program to the TEE instance 210 in the form of bytecode 225. The bytecode may be WebAssembly ("WASM") bytecode. The TEE 210 may also include an executable 215, which may include instructions or commands that form all or part of a workload. In an example, the runtime 193 may execute the instructions of the executable 215 and monitor the memory access patterns that occur while the executable 215 is running.

Additionally, an introspection channel 270 may be created between the runtime 193 and the owner 220. The introspection channel 270 may provide an encrypted connection between the owner 220 and the runtime 193 and the owner 220 may pass introspection commands (e.g., commands to look for specific patterns 250 in memory accessing code) to the runtime 193. For example, the communication through introspection channel 270 may be a secure communication channel that utilizes the Secure Sockets Layer ("SSL") and may be controlled through cryptographically secured keys or tokens. Encrypted data may be communicated through the introspection channel 270 where it is then decrypted by the receiver. The encryption and decryption may utilizing hashing functions such as the Secure Hash Algorithm ("SHA") (e.g., SHA-128, SHA-256, etc.) or other hashing functions such as MDS. For example, the encrypted communications, secrets, tokens or keys may appear to be a random string of numbers and letters (e.g., 140RA9T426ED494E01R019). Additionally, the encryption and decryption processes may be performed according to the Advanced Encryption Standard ("AES"). AES is based on a design principle known as a substitution—permutation network, and may utilize keys with a key size of 128, 192, or 256 bits. The patterns 250 may be provided by a supervisor 205. Once wasteful or malicious activity is detected (e.g., a malicious pattern 250 is identified), the TEE 210 or runtime 193 may generate a report 260 summarizing the results from the introspection service. The report 260 may be provided to the owner 220 and remedial action may take place. For example, the owner 220 may request the supervisor 205 to stop execution of the TEE 210.

Figure 3:
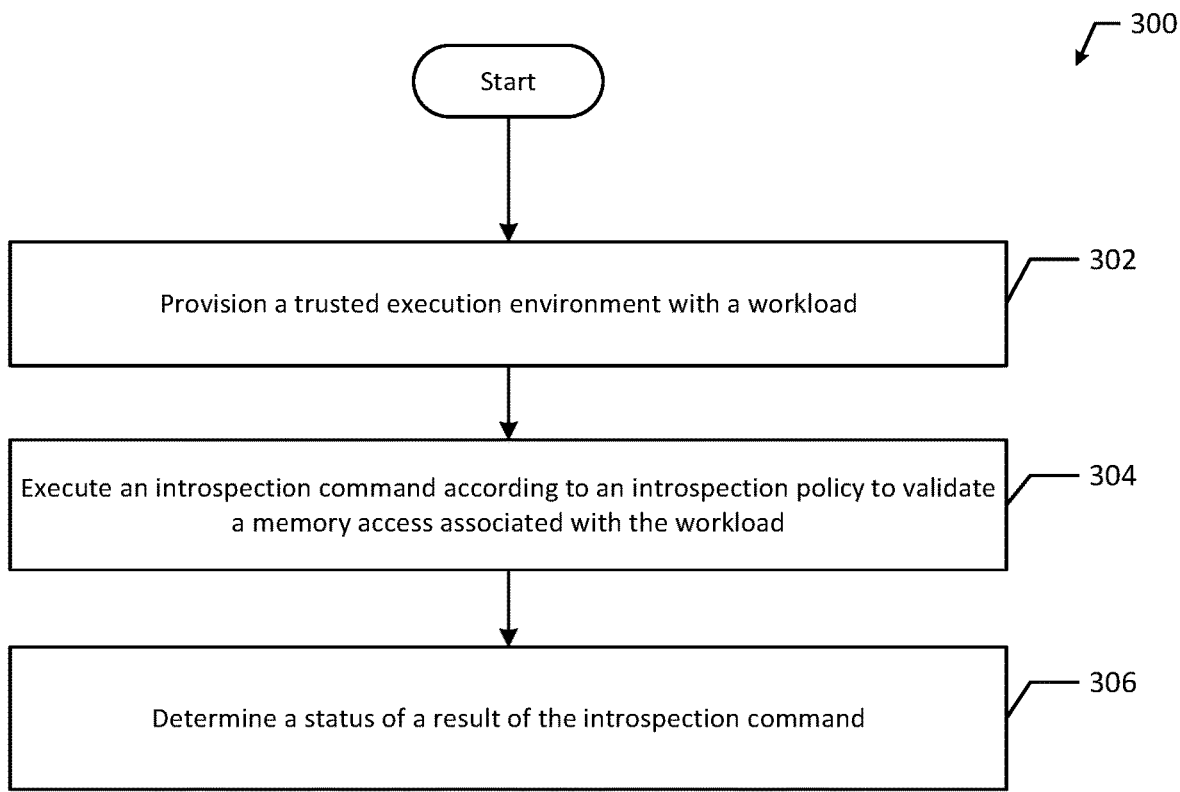
FIG. 3 illustrates a flowchart of an example process performing introspection for TEE instances according to an example embodiment of the present disclosure.

FIG. 3 illustrates a flowchart of an example method 300 for performing introspection for TEE instances in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes provisioning a TEE with a workload (block 302). For example, a TEE 210 may be provisioned with a workload and the workload may include an introspection module (e.g., introspection module 165A, hereinafter referred to generally as introspection module 165). It should be appreciated that TEE instance 210 of FIG. 2 may represent one of the TEE instance(s) 160A-B of FIG. 1, which may each be referred to generally as TEE instance 210. Method 300 also includes executing an introspection command according to an introspection policy to validate a memory access associated with the workload (block 304). For example, the introspection module 165 may execute an introspection command(s) according to an introspection policy. The introspection command(s) may be configured to validate one or more memory accesses associated with the workload. The introspection commands may be provided by a hypervisor 180 or supervisor 205.

The introspection policy may specify which part of the TEE 210 are exposed to the introspection commands or the introspection module 165. For example, the introspection policy may dictate what portions of memory or reviewed for introspection purposes. In some cases, memory associated with high-risk workflows may be exposed to the introspection commands. In other cases, portions of memory that have shown vulnerabilities in the past may be exposed to the introspection commands. The introspection policy specific addresses the introspection module 165 has access to, and in some cases the introspection policy may grant read access to these addresses or portion of memory. For example, the introspection module 165 may be restricted to read access or read-only access in the event the TEE 210 becomes a malicious TEE thereby preventing a now malicious introspection module 165 from performing additional malicious acts. In another example, the TEE 210 may be stopped from unnecessarily executing commands and storing data when wasteful memory access patterns are detected. For example, the TEE 210 may be paused or stopped instead of needlessly looping through instructions, such as repeatedly trying to obtain a lock or repeatedly trying and failing to update a table. Stopping the TEE 210 from performing these wasteful activities may advantageously conserve computing and memory resources.

The introspection policy may also identify connectors and accelerators the introspection module 165 has access to. Connectors and accelerators may assist with generating rules and data objects necessary for the introspection module 165 or other applications of the TEE 210 to send messages or make requests of external systems. The connectors and accelerators may also assist with processing the results or responses to the messages or requests. In some examples, the connectors and accelerators may parse files, import metadata through introspection, connect to and analyze external databases, etc. The accelerator may also convert the resulting information into a specific class, property, and activity and determine the requisite connector rules to build the connector.

Then, method 300 includes determining a status of a result of the introspection command (block 306). For example, the introspection module 165 may determine a status of a result of the introspection command(s). The status may be a failure status or a success status. Additionally, the status may be associated with a result of a single introspection command or the result of executing multiple introspection commands. In another example, the TEE instance 210 or another component of the TEE instance may determine the status of the result obtained from executing the introspection command. A failure status may indicate that the one or more memory accesses matches a predetermined pattern, which may be a previously identified pattern of malicious activity or a pattern indicating unnecessary and wasteful use of memory and computing resources. In an example, the introspection module 165 may compare the memory accesses to various predetermined patterns stored in an introspection log. The predetermined patterns or log may be provided by the hypervisor 180 or supervisor 205.

In an example, the introspection command(s) may include an instruction to compare a memory access or a group of memory accesses to the predetermined pattern(s) provided by the hypervisor 180. The predetermined pattern may be a pattern of memory reads from memory or a specific memory location. For example, a specific pattern or sequence of memory accesses may indicate malicious activity by the TEE. In another example, the predetermined pattern may be a pattern memory writes to the memory or a specific memory location. Other example patterns include a pattern or sequence of URLs visited by the workload, files accessed by the workload, messages sent by the workload, etc. In other example, the predetermined pattern may be related to types of data read from the memory and types of data written to the memory. Any of the patterns mentioned above may indicate malicious activity and may result in a failure status after executing the introspection command(s).

Figure 4:
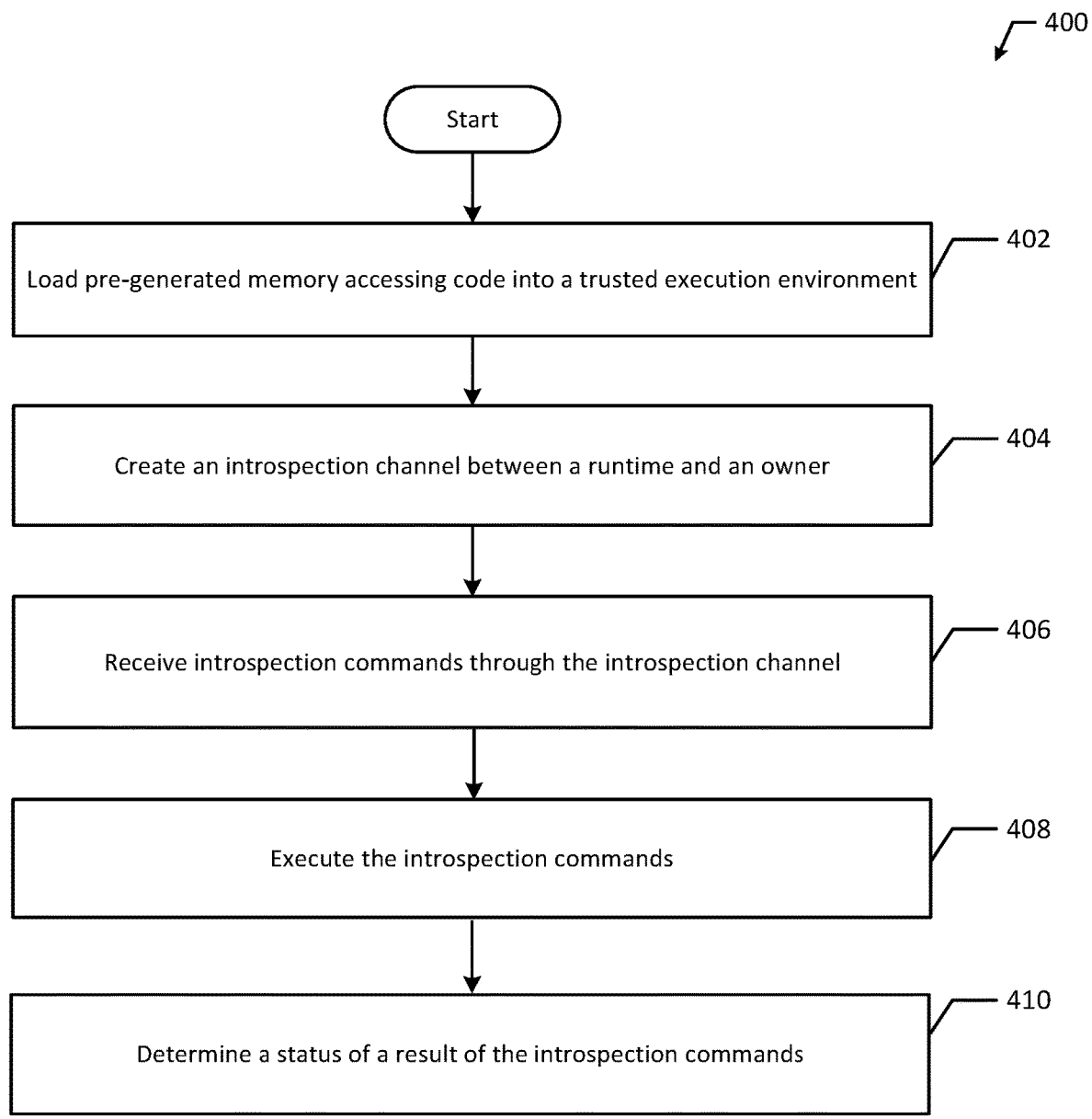
FIG. 4 illustrates a flowchart of an example process performing introspection for TEE instances according to an example embodiment of the present disclosure.

FIG. 4 illustrates a flowchart of an example method 400 for performing introspection for TEE instances in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In the illustrated example, method 400 includes loading pre-generated memory accessing code into a TEE (block 402). For example, a runtime 193 may load pre-generated memory accessing code into the TEE 210. In an example, the code is supplied by an owner 220. The pre-generated code may be a bytecode, such as a WebAssembly ("WASM") bytecode or Berekely Packet Filter ("BPF") bytecode. In another example, the pre-generated code may be native code such as native client ("NaCl") code. Method 400 also includes creating an introspection channel between a runtime and an owner (block 304). For example, an introspection channel 270 may be created between the runtime 193 and the owner 220. The introspection channel 270 may be an encrypted connection between the owner 220 and the runtime 193.

Additionally, method 400 includes receiving introspection commands through the introspection channel (block 406). For example, the runtime 193 may receive the introspection commands through the introspection channel 270. The introspection commands may be received from a hypervisor 180, a supervisor 205 or the owner 220. Then, method 400 includes executing the introspection commands (block 408). For example, the runtime 193 may execute the introspection commands, which are configured to validate a memory access in the pre-generated code. In an example, the introspection commands may track or intercept the memory access and compare the memory access to known malicious memory access patterns. The resulting comparisons or intercepted memory accesses may be results output after executing the introspection commands.

Method 400 also includes determining a status of a result of the introspection commands (block 410). For example, the runtime 193 may determine the status of the result of the introspection commands, which are configured to validate a memory access in the pre-generated code. Similar to method 300, the status may be a failure status or a success status. The runtime, the TEE instance 210, or another component of the TEE instance 210 may determine the status of the result obtained from executing the introspection commands. A failure status may indicate that the memory accesses match a predetermined pattern associated with malicious activity. The predetermined patterns or sequences described in method 400 may have the same or similar characteristics to the predetermined patterns discussed above with respect to method 300. Responsive to determining the status as a failure status, execution of the TEE 210 may be paused or stopped completely.

It should be appreciated that the various features and descriptions associated with method 400 and FIG. 4 may be applied to method 300 and FIG. 3. Similarly, the various features and descriptions associated with method 300 and FIG. 3 may be applied to method 400 and FIG. 4. For example, the features and capabilities of the introspection module 165 described above in method 300 may be associated with the runtime 193 of method 400 and vice versa. In some examples, the introspection module 165 may be a runtime 193 that is extended with introspection capabilities. Some architectures may support extendable runtimes and those runtimes may be extended to include introspection capabilities inside an encrypted virtual machine.

Figure 5A:
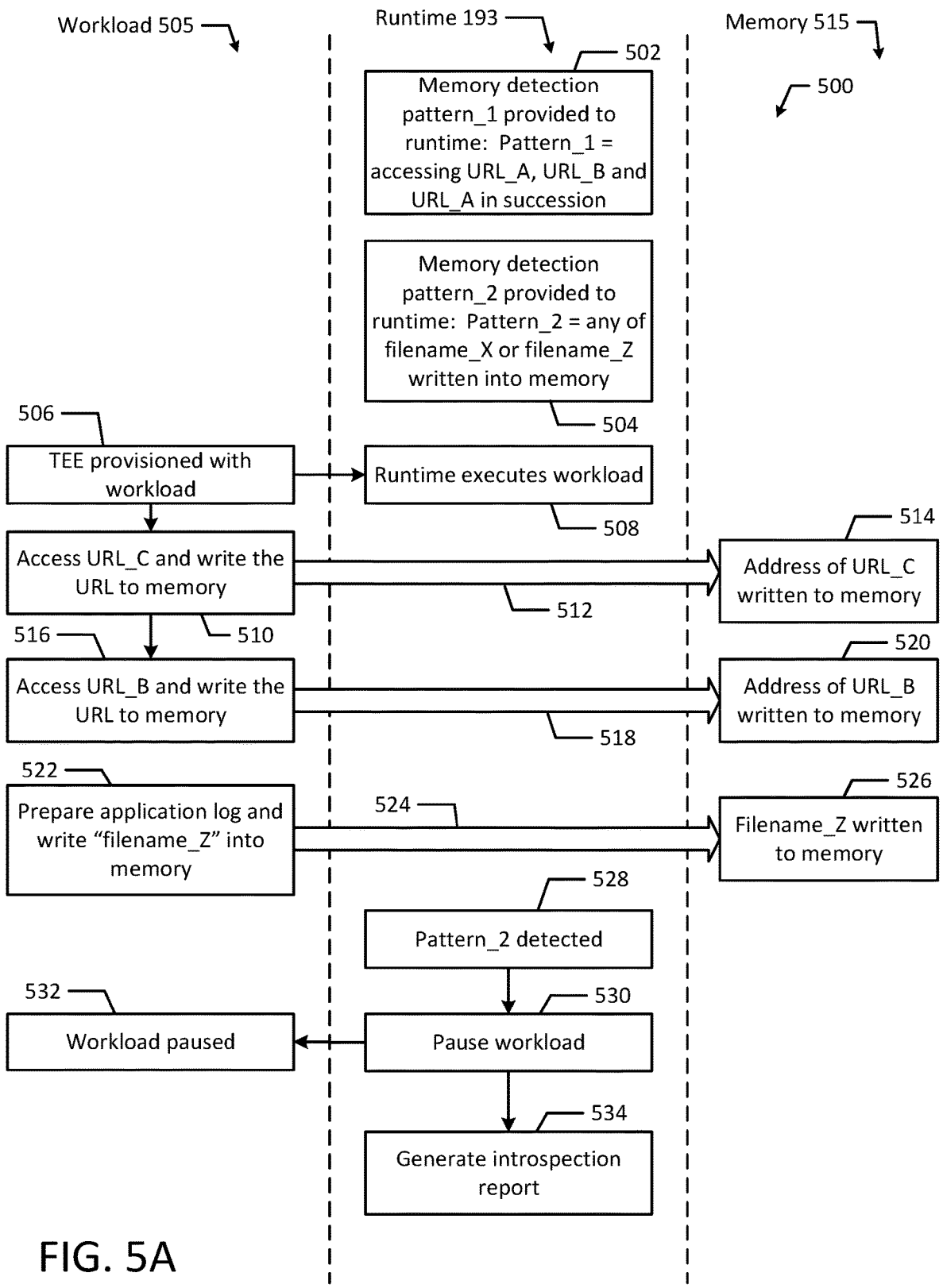
FIGS. 5A and 5B illustrate a flow diagram of an example process performing introspection services for a TEE while preserving privacy according to an example embodiment of the present disclosure.
Figure 5B:
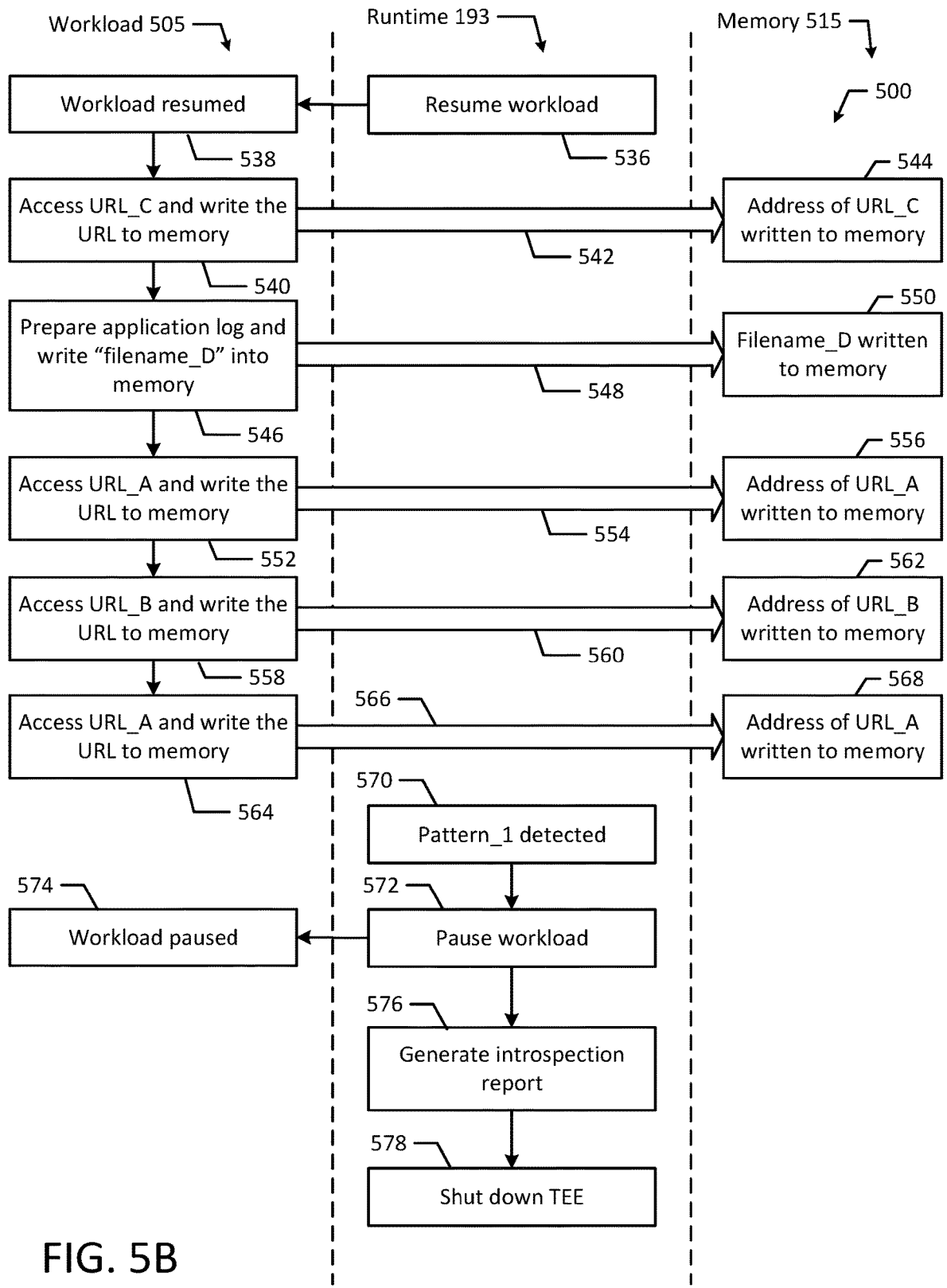

FIGS. 5A and 5B depicts a flow diagram illustrating an example method 500 for performing introspection services for a TEE while preserving privacy according to an example embodiment of the present disclosure. Although the example method 500 is described with reference to the flow diagram illustrated in FIGS. 5A and 5B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, a runtime 193 executing a workload 505 may communicate with memory 515 to perform example method 400.

In the illustrated example, a runtime 193 may be provided a memory detection pattern (e.g., "pattern_1") (block 502). The memory detection pattern (e.g., "pattern_1") may be a pattern of accessing "URL_A", "URL_B" and then "URL_A" again in succession. Additionally, the runtime 193 may be provided another memory detection pattern (e.g., "pattern_2") (block 504). The memory detection pattern (e.g., "pattern_2") may be a pattern or any series of events involving writing "filename_X" or "filename_Y" into memory 515.

The TEE 210 is provisioned with the workload 505 (block 506). Then, the runtime 193 executes the workload 505 (block 508). While executing the workload 505, the workload accesses "URL_C" and writes the URL 512 to memory 515 (block 510). For example, the TEE 210 may provide web browser functions and services and when visiting a URL (e.g., URL 512), the TEE 210 acting as a web browser may write to memory 515 the URL that is being visited. Then the address of "URL_C" is written to memory 515 (block 514). In an example, each act of writing the URL 512 to memory may be intercepted and analyzed by the runtime 193 to determine if that access is part of a malicious pattern. The workload 505 also accesses "URL_B" and writes the URL 518 to memory 515 (block 516). Then the address of "URL_B" is written into memory 515 (block 520). Again, the act of writing URL 518 to memory 515 may be intercepted and documented to compare the instant activity along with previous activity to known malicious patterns such as "pattern_1" and "pattern_2." Tracking this information allows the runtime 193 to extract security-relevant information to determine if the workload 505 or TEE 210 is compromised.

Next, the workload 505 prepares an application log and writes a filename 524 (e.g., "filename_Z") into memory 515 (block 522). In an example, the workload may customarily prepare an application log that documents activities performed by the workload 505. For example, the application log may include a log of memory writes from a CPU to RAM. Then, "filename_Z" is written into memory (block 526). Each of these activities may be tracked or intercepted by the runtime 193 and compared to the memory detection patterns. Since "filename_Z" was a filename 624 included in "pattern_2", the pattern is detected by the runtime 193 (block 528). After the runtime 193 detects the pattern, the runtime 193 pauses the workload 505 (block 530). For example, the workload 505 may be paused as soon as a malicious memory access pattern is detected to prevent further malicious activity or damage to the system. Now the workload 505 is paused (block 532). In other examples, the runtime 193 may continue executing the workload 505 to detect and log other malicious memory access patterns. After pausing the workload 505, the runtime 193 generates an introspection report (block 534). The introspection report may log each malicious memory access activity. In some examples, the introspection report may be analyzed and reviewed to determine other potential malicious memory access patterns that can be used to detect future malicious activity. Once the report is generated, the report may be passed along to a hypervisor 180 or to an owner to take corrective action. In another example, the report may be passed along to the hypervisor 180 or owner after a threshold amount of malicious activity is detected (e.g., after three possible malicious memory access patterns are detected).

Continuing on FIG. 5B, the runtime 193 resumes the workload 505 (block 536). The workload resumes (block 538) and accesses "URL_C" and writes the URL 542 to memory 515 (block 540). Then, the address of "URL_C" is written into memory 515 (block 544). Similar to "pattern_2" a list of URLs may be included in a pattern that includes a list of malicious sites, such that if a single malicious site is visited, the runtime 193 detects the malicious activity. Additionally, patterns may be adapted to identify if outgoing URL requests were initiated by a human user or malware that is compromising the security of the TEE 210. Then, the workload prepares an application log and write a filename 548 (e.g., "filename_D") into memory 515 (block 546). In an example, "filename_D" may be a file that was opened while visiting "URL_C." Then, "filename_D" is written into memory (block 550). The application log may include a list of all files opened while visiting a URL and the runtime 193 may monitor the activity performed by the web browser application to determine if any malicious files are being accessed or opened by the workload 505.

The runtime 193 continues executing the workload 505, which accesses "URL_A" and writes the URL 554 to memory 515 (block 552). Then, the address of "URL_A" is written into memory 515 (block 556). Next, the workload accesses "URL_B" and writes the URL 560 to memory 515 (block 558). Now, the address of "URL_B" is written into memory 515 (block 562). Similarly, the workload accesses "URL_A" and writes the URL 566 to memory 515 (block 558). Again, the address of "URL_A" is written into memory 515 (block 568).

Writing "URL_A", "URL_B" and "URL_A" to memory in succession matches "pattern_1" and the runtime 193 detects the pattern of memory accesses (block 570). For example, such a pattern may indicate that a sequence of malicious activity of opening or accessing files at "URL_A" that are used to obtain privileged information about the TEE and then that information is leaked when visiting "URL_B." In another example, the pattern may indicate a sequence of unnecessary activity resulting unnecessary memory usage and wasting computing resources. After "pattern_1" is detected, the runtime 193 may pause the workload 505 (block 572) and once the workload 505 is paused (block 574), the runtime 193 may generate another introspection report (block 576). The generated introspection report may be a continuous introspection log that includes each malicious pattern detected. However, in the illustrated example, an introspection report is generated each instance a malicious pattern is detected. Additionally, the runtime 193 may shut down the TEE 210 (block 578). In another example, the introspection reports may be sent to a hypervisor 180 or supervisor 205, which may then act to shut down the TEE 210 to prevent further malicious activity.

Figure 6:
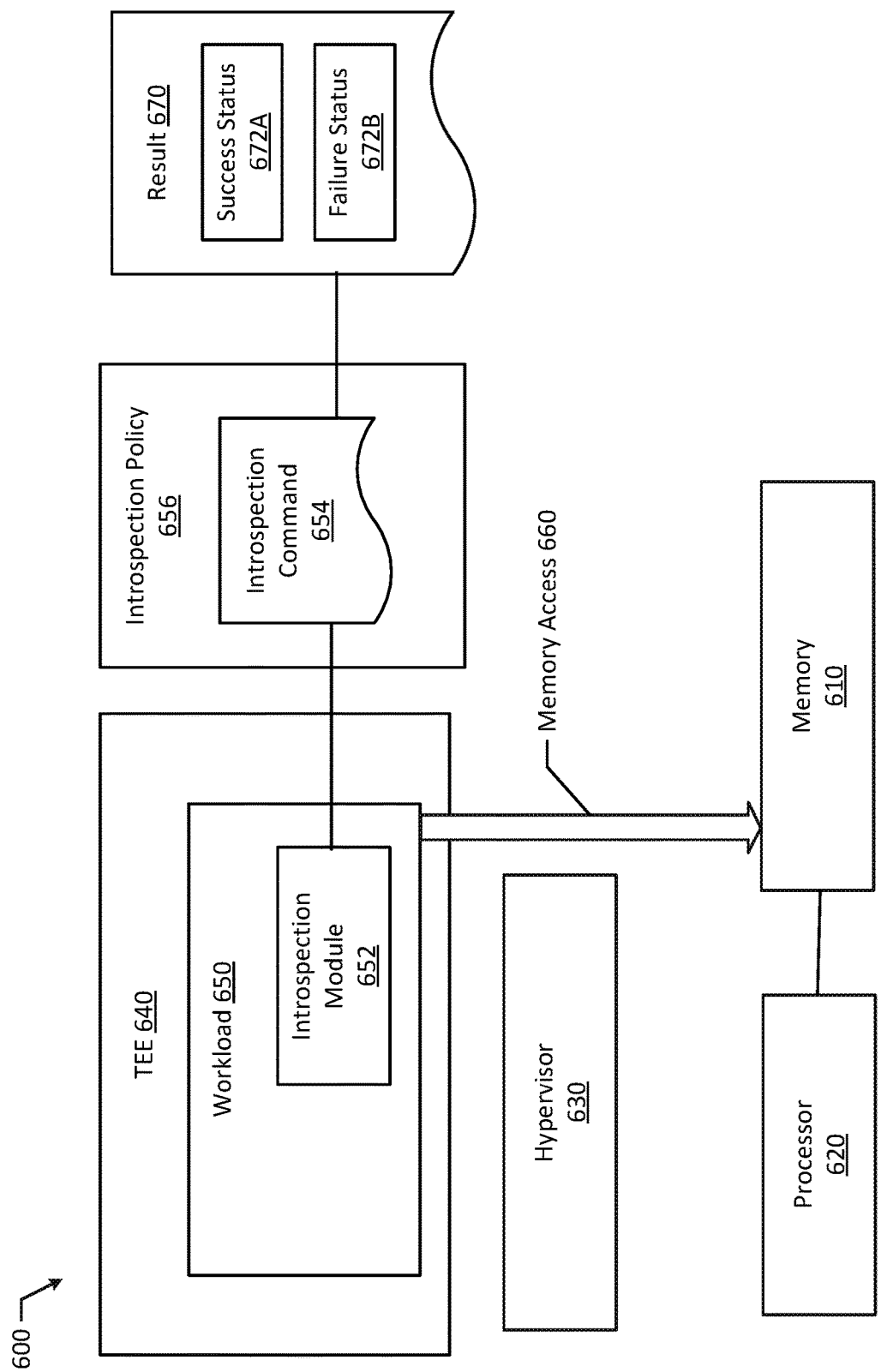
FIG. 6 illustrates a block diagram of an example introspection system according to an example embodiment of the present disclosure.

FIG. 6 is a block diagram of an example introspection system 600 for TEEs according to an example of the present disclosure. The introspection system 600 may preserve privacy while performing introspection services. The introspection system 600 includes a memory 610, a processor 620 in communication with the memory 610, a hypervisor 630, and a trusted execution environment 640. The TEE 640 may be provisioned with a workload 650 and may include an introspection module 652. The introspection module 652 may be configured to execute an introspection command 654 according to an introspection policy 656. The introspection command 654 may be configured to validate at least one memory access 660 associated with the workload 650. Additionally, the introspection module 652 may be configured to determine a status 672A-B of a result 670 of the introspection command(s) 654. The status 672A-B may be a failure status 672A or a success status 672B.

Figure 7:
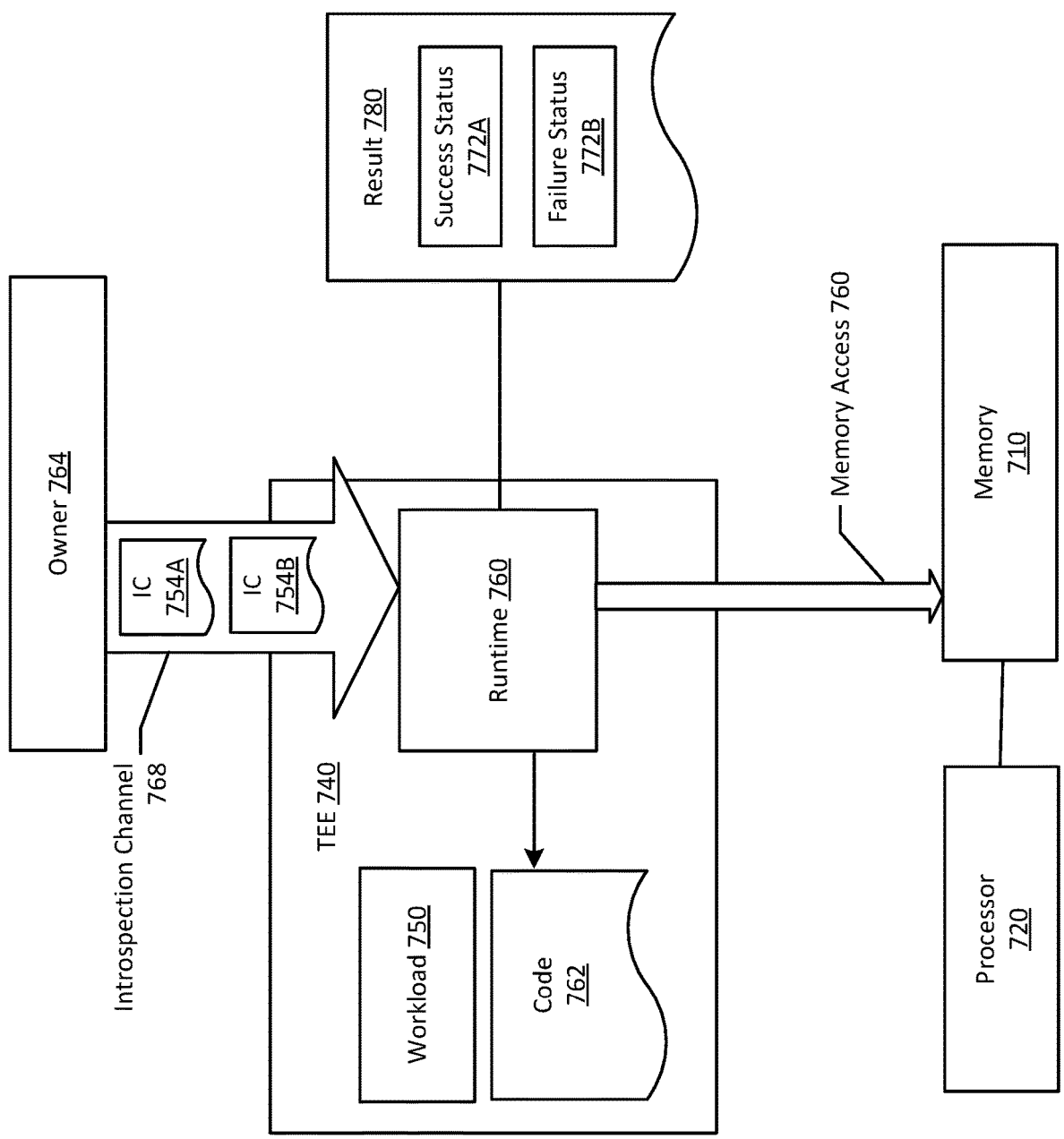
FIG. 7 illustrates a block diagram of an example introspection system according to an example embodiment of the present disclosure.

FIG. 7 is a block diagram of an example introspection system 700 for TEEs according to an example of the present disclosure. The introspection system 700 may preserve privacy while performing introspection services. The system 700 includes a memory 710, a processor 720 in communication with the memory 710, a trusted execution environment 740 provisioned with a workload 750, and a runtime 760 executing within the TEE. The runtime 760 may be configured to load a pre-generated memory accessing code 762 into the TEE 740. The code may be supplied by an owner 764. Additionally, the runtime 760 may be configured to receive introspection commands ("ICs") 754A-B through an introspection channel 768. The introspection channel 768 may be created between the runtime 760 and the owner 764. Additionally, the runtime 760 may be configured to execute the introspection command(s) 754A-B and the introspection commands 754A-B may be configured to validate a memory access 770 in the pre-generated code 762. The runtime 760 may also be configured to determine a status 772A-B of a result 780 of the introspection commands 754A-B. The status 772A-B may be a failure status 772A or a success status 772B.

The runtime 760 advantageously allows the TEE 740 to perform introspection services, which would otherwise be provided as part of a hypervisor. However, the security model of a TEE typically does not allow the hypervisor access to the memory of the TEE 740. By providing the introspection channel 768, the owner 764 may provide introspection commands 754A-B through the channel 768 to look for specific malicious patterns in memory accessing code. Once the results 780 are obtained, the runtime 760 may send the results of executing the introspection commands 754A-B to the owner 764. Then, the owner 764 may take action such as requesting the hypervisor to stop execution of the TEE 740 to prevent further malicious activity and further harm to the system 700.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory, a processor in communication with the memory, a hypervisor, and a trusted execution environment (TEE). The TEE is provisioned with a workload and includes an introspection module. The introspection module is configured to execute an introspection command according to an introspection policy. The introspection command is configured to validate at least one memory access associated with the workload. The introspection module is also configured to determine a status of a result of the introspection command, wherein the status is one of a failure status and a success status.

In a 2nd exemplary aspect of the present disclosure, which may be used in combination with any one or more of the preceding aspects (e.g., the 1st aspect), the failure status indicates that the at least one memory access matches a predetermined pattern.

In a 3rd exemplary aspect of the present disclosure, which may be used in combination with any one or more of the preceding aspects (e.g., the 2nd aspect), the hypervisor is configured to provide the predetermined pattern to the TEE.

In a 4th exemplary aspect of the present disclosure, which may be used in combination with any one or more of the preceding aspects (e.g., the 2nd aspect), the introspection command includes an instruction to compare the at least one memory access to the predetermined pattern.

In a 5th exemplary aspect of the present disclosure, which may be used in combination with any one or more of the preceding aspects (e.g., the 4th aspect), the predetermined pattern includes a pattern of memory reads from the memory, memory writes to the memory, URLs visited by the workload, files accessed by the workload, messages sent by the workload, types of data read from the memory, and/or types of data written to the memory.

In a 6th exemplary aspect of the present disclosure, which may be used in combination with any one or more of the preceding aspects (e.g., the 1st aspect), the introspection module is a runtime that is extended with introspection capabilities.

In a 7th exemplary aspect of the present disclosure, which may be used in combination with any one or more of the preceding aspects (e.g., the 1st aspect), the TEE is an encrypted virtual machine.

In an 8th exemplary aspect of the present disclosure, which may be used in combination with any one or more of the preceding aspects (e.g., the 1st aspect), the introspection command is provided to the introspection module through an introspection channel.

In a 9th exemplary aspect of the present disclosure, which may be used in combination with any one or more of the preceding aspects (e.g., the 8th aspect), the introspection channel is an encrypted connection.

In a 10th exemplary aspect of the present disclosure, which may be used in combination with any one or more of the preceding aspects (e.g., the 1st aspect), the introspection policy specifies which parts of the TEE are exposed to the introspection command or the introspection module.

In an 11th exemplary aspect of the present disclosure, which may be used in combination with any one or more of the preceding aspects (e.g., the 10th aspect), the introspection policy specifies at least one address the introspection module has access to.

In a 12th exemplary aspect of the present disclosure, which may be used in combination with any one or more of the preceding aspects (e.g., the 10th aspect), the introspection policy grants the introspection module read access to a first portion of memory.

In a 13th exemplary aspect of the present disclosure, which may be used in combination with any one or more of the preceding aspects (e.g., the 1st aspect), the introspection policy specifies an accelerator that the introspection module has access to.

Aspects of the subject matter described herein may be useful alone or in combination with one or more other aspects described herein. In a 14th exemplary aspect of the present disclosure a method includes provisioning a trusted execution environment (TEE) with a workload. The workload includes an introspection module. The method also includes executing, by the introspection module, an introspection command according to an introspection policy. The introspection command is configured to validate at least one memory access associated with the workload. Additionally, the method includes determining, by the introspection module, a status of a result of the introspection command. The status is one of a failure status and a success status.

In a 15th exemplary aspect of the present disclosure, which may be used in combination with any one or more of the preceding aspects (e.g., the 14th aspect), the method further includes supplying, by a hypervisor, the introspection command to the TEE.

In a 16th exemplary aspect of the present disclosure, which may be used in combination with any one or more of the preceding aspects (e.g., the 14th aspect), the method further includes supplying, by a supervisor, the introspection command to the TEE.

In a 17th exemplary aspect of the present disclosure, which may be used in combination with any one or more of the preceding aspects (e.g., the 14th aspect), the method further includes stopping execution of the TEE responsive to determining the status is the failure status.

In an 18th exemplary aspect of the present disclosure, which may be used in combination with any one or more of the preceding aspects (e.g., the 14th aspect), the failure status indicates that the at least one memory access matches a predetermined pattern.

In a 19th exemplary aspect of the present disclosure, which may be used in combination with any one or more of the preceding aspects (e.g., the 18th aspect), the method further incudes providing, by a hypervisor, the predetermined pattern to the TEE.

In a 20th exemplary aspect of the present disclosure, which may be used in combination with any one or more of the preceding aspects (e.g., the 18th aspect), the introspection command includes an instruction to compare the at least one memory access to the predetermined pattern.

In a 21st exemplary aspect of the present disclosure, which may be used in combination with any one or more of the preceding aspects (e.g., the 14th aspect), the introspection policy specifies which parts of the TEE are exposed to the introspection command or the introspection module.

In a 22nd exemplary aspect of the present disclosure, which may be used in combination with any one or more of the preceding aspects (e.g., the 21st aspect), the introspection policy specifies at least one address the introspection module has access to.

In a 23rd exemplary aspect of the present disclosure, which may be used in combination with any one or more of the preceding aspects (e.g., the 21st aspect), the introspection policy grants the introspection module read access to a first portion of memory.

In a 24th exemplary aspect of the present disclosure, which may be used in combination with any one or more of the preceding aspects (e.g., the 14th aspect), the introspection policy specifies an accelerator that the introspection module has access to.

Aspects of the subject matter described herein may be useful alone or in combination with one or more other aspects described herein. In a 25th exemplary aspect of the present disclosure a non-transitory machine-readable medium stores code, which when executed by a processor is configured to provision a trusted execution environment (TEE) with a workload. The workload includes an introspection module. The non-transitory machine-readable medium is also configured to execute an introspection command according to an introspection policy. The introspection command is configured to validate at least one memory access associated with the workload. Additionally, the non-transitory machine-readable medium is configured to determine a status of a result of the introspection command. The status is one of a failure status and a success status.

Aspects of the subject matter described herein may be useful alone or in combination with one or more other aspects described herein. In an 26th exemplary aspect of the present disclosure a system includes a means for provisioning a trusted execution environment (TEE) with a workload. The workload includes an introspection module. The system also includes a means for executing an introspection command according to an introspection policy. The introspection command is configured to validate at least one memory access associated with the workload. Additionally, the system includes a means for determining a status of a result of the introspection commands, wherein the status is one of a failure status and a success status.

Aspects of the subject matter described herein may be useful alone or in combination with one or more other aspects described herein. In a 27th exemplary aspect of the present disclosure a system includes a memory, a processor in communication with the memory, a trusted execution environment (TEE) provisioned with a workload, and a runtime executing within the TEE. The runtime is configured to load a pre-generated memory accessing code into the TEE. The code is supplied by an owner. The runtime is also configured to receive introspection commands through an introspection channel. The introspection channel is created between the runtime and the owner. Additionally, the runtime is configured to execute the introspection commands. The introspection commands are configured to validate a memory access in the pre-generated code. The runtime is also configured to determine a status of a result of the introspection commands. The status is one of a failure status and a success status.

In a 28th exemplary aspect of the present disclosure, which may be used in combination with any one or more of the preceding aspects (e.g., the 27th aspect), the introspection channel is an encrypted connection.

In a 29th exemplary aspect of the present disclosure, which may be used in combination with any one or more of the preceding aspects (e.g., the 27th aspect), a hypervisor is configured to supply the introspection commands to the runtime.

In a 30th exemplary aspect of the present disclosure, which may be used in combination with any one or more of the preceding aspects (e.g., the 27th aspect), the pre-generated memory accessing code is bytecode.

In a 31st exemplary aspect of the present disclosure, which may be used in combination with any one or more of the preceding aspects (e.g., the 27th aspect), the bytecode is one of web assembly bytecode and Berkeley Packet Filter (BPF) bytecode.

In a 32nd exemplary aspect of the present disclosure, which may be used in combination with any one or more of the preceding aspects (e.g., the 27th aspect), the code is native code.

In a 33rd exemplary aspect of the present disclosure, which may be used in combination with any one or more of the preceding aspects (e.g., the 32nd aspect), the native code is native client (NaCl) code.

In a 34th exemplary aspect of the present disclosure, which may be used in combination with any one or more of the preceding aspects (e.g., the 27th aspect), a hypervisor is configured to stop execution of the TEE responsive to the runtime determining the status is the failure status.

In a 35th exemplary aspect of the present disclosure, which may be used in combination with any one or more of the preceding aspects (e.g., the 27th aspect), the failure status indicates that the at least one memory access matches a predetermined pattern.

In a 36th exemplary aspect of the present disclosure, which may be used in combination with any one or more of the preceding aspects (e.g., the 35th aspect), the introspection command includes an instruction to compare the at least one memory access to the predetermined pattern.

In a 37th exemplary aspect of the present disclosure, which may be used in combination with any one or more of the preceding aspects (e.g., the 36th aspect), the predetermined pattern includes a pattern of at least one of memory reads from the memory, memory writes to the memory, URLs visited by the workload, files accessed by the workload, messages sent by the workload, types of data read from the memory, and types of data written to the memory.

Aspects of the subject matter described herein may be useful alone or in combination with one or more other aspects described herein. In a 38th exemplary aspect of the present disclosure a method includes loading, by a runtime, pre-generated memory accessing code into a trusted execution environment. The code is supplied by an owner. The method also includes creating an introspection channel between the runtime and the owner and receiving, by the runtime, introspection commands through the introspection channel. Additionally, the method includes executing, by the runtime, the introspection commands. The introspection commands are configured to validate a memory access in the pre-generated code. The method also includes determining, by the runtime, a status of a result of the introspection commands. The status is one of a failure status and a success status.

In a 39th exemplary aspect of the present disclosure, which may be used in combination with any one or more of the preceding aspects (e.g., the 38th aspect), the introspection channel is an encrypted connection.

In a 40th exemplary aspect of the present disclosure, which may be used in combination with any one or more of the preceding aspects (e.g., the 38th aspect), the method further includes supplying, by a hypervisor, the introspection commands to the runtime.

In a 41st exemplary aspect of the present disclosure, which may be used in combination with any one or more of the preceding aspects (e.g., the 38th aspect), the method further includes supplying, by a supervisor, the introspection commands to the runtime.

In a 42nd exemplary aspect of the present disclosure, which may be used in combination with any one or more of the preceding aspects (e.g., the 38th aspect), the method further includes supplying, by the owner, the introspection commands to the runtime.

In a 43rd exemplary aspect of the present disclosure, which may be used in combination with any one or more of the preceding aspects (e.g., the 38th aspect), the code is bytecode.

In a 44th exemplary aspect of the present disclosure, which may be used in combination with any one or more of the preceding aspects (e.g., the 43rd aspect), the bytecode is one of WebAssembly (WASM) bytecode and Berkeley Packet Filter (BPF) bytecode.

In a 45th exemplary aspect of the present disclosure, which may be used in combination with any one or more of the preceding aspects (e.g., the 38th aspect), the code is native code.

In a 46th exemplary aspect of the present disclosure, which may be used in combination with any one or more of the preceding aspects (e.g., the 45th aspect), the native code is native client (NaCl) code.

In a 47th exemplary aspect of the present disclosure, which may be used in combination with any one or more of the preceding aspects (e.g., the 38th aspect), the method further includes stopping execution of the TEE responsive to determining the status is the failure status.

Aspects of the subject matter described herein may be useful alone or in combination with one or more other aspects described herein. In a 48th exemplary aspect of the present disclosure a non-transitory machine-readable medium stores code, which when executed by a processor is configured to load a pre-generated memory accessing code into a trusted execution environment. The code is supplied by an owner. The non-transitory machine-readable medium is also configured to create an introspection channel between the runtime and the owner, receive introspection commands through the introspection channel, and execute the introspection commands. The introspection commands are configured to validate a memory access in the pre-generated code. Additionally, the non-transitory machine-readable medium is configured to determine a status of a result of the introspection commands, wherein the status is one of a failure status and a success status.

Aspects of the subject matter described herein may be useful alone or in combination with one or more other aspects described herein. In a 49th exemplary aspect of the present disclosure a system includes a means for loading a pre-generated memory accessing code into a trusted execution environment. The code is supplied by an owner. The system also includes a means for creating an introspection channel between a runtime and the owner, a means for receiving introspection commands through the introspection channel, and a means for executing the introspection commands. The introspection commands are configured to validate a memory access in the pre-generated code. Additionally, the system includes a means for determining a status of a result of the introspection commands, wherein the status is one of a failure status and a success status.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory;
a hypervisor; and
a trusted execution environment (TEE), wherein the TEE is provisioned with a workload and includes a runtime executing the workload, wherein the runtime is configured to:
execute an introspection command according to an introspection policy, wherein the introspection policy identifies connectors and accelerators available to the introspection command, wherein the connectors can connect to external databases for the introspection command, wherein the accelerators are configurable to convert resulting information of the introspection command into one or more different forms and to determine requisite connector rules to build a connector, the introspection command configured to validate at least one memory access associated with the workload, and
based on a status of a result of the introspection command, wherein the status is one of a failure status and a success status, implement a security enforcement mechanism that comprises at least one of pausing the workload, shutting down the TEE, or stopping execution of the TEE.

2. The system of claim 1, wherein the failure status indicates that the at least one memory access matches a predetermined pattern.

3. The system of claim 2, wherein the hypervisor is configured to provide the predetermined pattern to the TEE.

4. The system of claim 2, wherein the introspection command includes an instruction to compare the at least one memory access to the predetermined pattern.

5. The system of claim 4, wherein the predetermined pattern includes a pattern of at least one of memory reads from the memory, memory writes to the memory, URLs visited by the workload, files accessed by the workload, messages sent by the workload, types of data read from the memory, and types of data written to the memory.

6. The system of claim 1, wherein the TEE is an encrypted virtual machine.

7. The system of claim 1, wherein the introspection command is provided to an introspection module through an introspection channel, and wherein the introspection channel is an encrypted connection.

8. The system of claim 1, wherein the introspection policy specifies which parts of the TEE are exposed to the introspection command or an introspection module, and the introspection policy grants the introspection module read access to a first portion of memory.

9. The system of claim 1, wherein the introspection policy specifies at least one (i) an address an introspection module has access to and (ii) an accelerator that the introspection module has access to.

10. A method comprising:
provisioning a trusted execution environment (TEE) with a workload for execution within a runtime, wherein the workload can comprise an introspection module;
executing, within the runtime, an introspection command according to an introspection policy, wherein the introspection policy identifies connectors and accelerators available to the introspection command, wherein the connectors can connect to external databases for the introspection command, wherein the accelerators are configurable to convert resulting information of the introspection command into one or more different forms and to determine requisite connector rules to build a connector, the introspection command configured to validate at least one memory access associated with the workload; and
based on a status of a result of the introspection command, wherein the status is one of a failure status and a success status, implementing a security enforcement mechanism that comprises at least one of pausing the workload, shutting down the TEE, stopping execution of the TEE.

11. The method of claim 10, further comprising supplying, by one of a hypervisor and a supervisor, the introspection command to the TEE.

12. The method of claim 10, further comprising responsive to determining the status is the failure status, stopping execution of the TEE.

13. The method of claim 10, wherein the failure status indicates that the at least one memory access matches a predetermined pattern, and wherein the introspection command includes an instruction to compare the at least one memory access to the predetermined pattern.

14. A system comprising:
a memory;
a processor in communication with the memory;
a trusted execution environment (TEE), wherein the TEE is provisioned with a workload, wherein the workload can comprise an introspection module; and
a runtime executing the workload within the TEE, wherein the runtime is configured to:
load a pre-generated memory accessing code into the TEE;
receive introspection commands through an introspection channel, wherein the introspection channel is created between the runtime and an owner, wherein the introspection policy identifies connectors and accelerators available to the introspection command, wherein the connectors can connect to external databases for the introspection command, wherein the accelerators are configurable to convert resulting information of the introspection command into one or more different forms and to determine requisite connector rules to build a connector;
execute the introspection commands according to an introspection policy, wherein the introspection policy is enforced by the runtime, wherein the introspection commands are configured to validate a memory access in the pre-generated code; and
based on a status of a result of the introspection commands, wherein the status is one of a failure status and a success status, implement a security enforcement mechanism that comprises at least one of, pausing the workload, shutting down the TEE, stopping execution of the TEE.

15. The system of claim 14, wherein the pre-generated memory accessing code is bytecode.

16. The system of claim 15, wherein the bytecode is one of WebAssembly bytecode and Berkeley Packet Filter (BPF) bytecode.

17. The system of claim 14, wherein the code is native code.

18. The system of claim 14, wherein a hypervisor is configured to stop execution of the TEE responsive to the runtime determining the status is the failure status, and wherein the failure status indicates that the at least one memory access matches a predetermined pattern.

19. The system of claim 18, wherein the predetermined pattern includes a pattern of at least one of memory reads from the memory, memory writes to the memory, URLs visited by the workload, files accessed by the workload, messages sent by the workload, types of data read from the memory, and types of data written to the memory.

* * * * *